United States Patent [19]

Pelc et al.

[11] 4,452,085

[45] Jun. 5, 1984

[54] METHOD AND MEANS FOR GENERATING TIME GAIN COMPENSATION CONTROL SIGNAL FOR USE IN ULTRASONIC SCANNER AND THE LIKE

[75] Inventors: Norbert J. Pelc; Stephen W. Flax, both of Waukesha, Wis.

[73] Assignee: General Electric Company, Rancho Cordova, Calif.

[21] Appl. No.: 369,370

[22] Filed: Apr. 19, 1982

[51] Int. Cl.³ .................. G01N 29/00; A61B 10/00
[52] U.S. Cl. .......................................... 73/631; 73/599;
73/900; 73/602; 128/660
[58] Field of Search ............... 73/900, 599, 631, 602;
367/65, 66, 67; 178/660

[56] References Cited

U.S. PATENT DOCUMENTS

| 3,309,914 | 3/1967 | Weighart | 73/631 |
| 4,016,750 | 4/1977 | Green | 73/900 |
| 4,043,181 | 8/1977 | Nigam | 73/631 |
| 4,228,688 | 10/1980 | Sharpe | 73/900 |
| 4,356,731 | 11/1982 | Mahony | 73/900 |

*Primary Examiner*—Howard A. Birmiel
*Attorney, Agent, or Firm*—Flehr, Hohbach, Test, Albritton & Herbert

[57] ABSTRACT

A time gain control (TGC) signal for a variable gain amplifier in an ultrasonic scanner is derived by determining the attenuation at many levels in the object under examination and then constructing the TGC signal based on the cumulative attenuation of an ultrasonic signal through the object. A zero crossing detector such as a Schmitt triggered monostable multivibrator receives a reflected ultrasonic wave signal and generates pulses which are counted during time intervals corresponding to a depth level in the object. By comparing the zero crossing density at one level to the zero crossing density at another level a measure of attenuation between the two levels is obtained.

1 Claim, 1 Drawing Figure

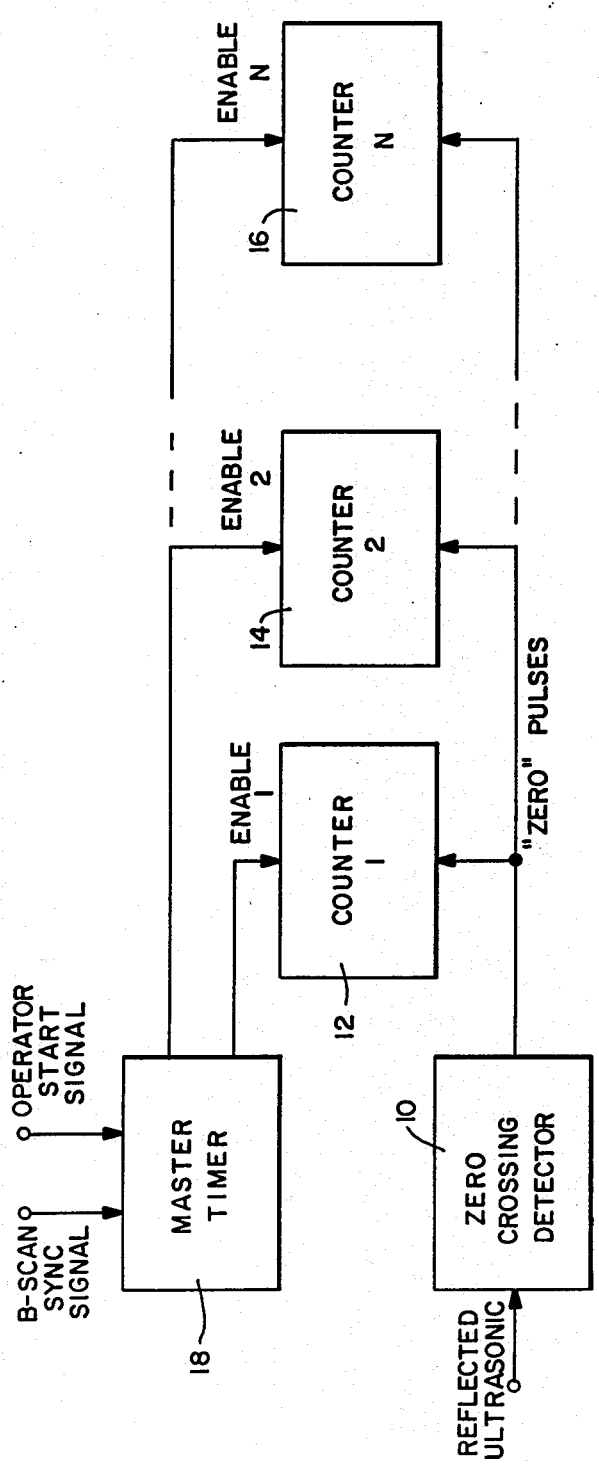
FIG.—1

METHOD AND MEANS FOR GENERATING TIME GAIN COMPENSATION CONTROL SIGNAL FOR USE IN ULTRASONIC SCANNER AND THE LIKE

This invention relates generally to ultrasonic scanners such as used for medical diagnostic purposes, and more particularly the invention relates to a method and means for compensating reflected ultrasonic signals to enhance analysis thereof.

Ultrasonic diagnostic systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasound system of General Electric Company provides both real time and static images on a television display.

Briefly, such systems utilize sound transducers to transmit ultrasonic (e.g. on the order of several megahertz) waves into a patient and to receive reflected signals. In one mode of operation, the transducer is attached to a plurality of hinged arms for movement in a single plane, and potentiometers associated with the hinged arms produce signals which identify the transducer position. Alternatively, a transducer array or a hand held transducer can be used. The echo signals are applied to a time gain compensated amplifier to adjust the echo signals for attenuation in passing through the patient. The adjusted signals are then passed through an analog to digital conversion and video processing circuitry and thence to scan converter circuitry for display formatting. The display comprises a plurality of pixels in horizontal rows and vertical colums with each pixel having a brightness level in response to the input signal. Conventionally, the brightness is defined by a 32 level Gray-scale, hence the pixel brightness level requires a five bit digital code.

Heretofore, the control signal for the time gain compensated (TGC) amplifier has been established by adjusting the time gain control signal until the output of the amplifier is approximately flat. This necessarily assumes that attenuation through the tissue under examination is generally uniform. However, the attenuation and signal scatter usually will vary in tissue, and the TGC signal based on an average response will necessarily be biased.

Disclosed in co-pending patent application No. Ser. No. 369,423, filed Apr. 19, 1982 for "Method and Means for Determining Ultrasonic Wave Attenuation in Tissue" is a method of determining frequency dependent attenuation at differing levels in tissue using a time domain analysis rather than a frequency domain analysis. More particularly, by counting the zero crossings of a reflected ultrasonic signal for different levels in tissue under examination and then comparing the zero crossing density at one level to the zero crossing density at a second level, the attenuation of the tissue between the two levels can be ascertained. The method and apparatus for determining zero crossing density is relatively simple and reliable.

An object of the present invention is an improved method of establishing a time gain control signal for a time gain compensated amplifier by using measurements of attenuation at various depths in tissue under examination.

Another object of the invention is means for use with ultrasonic scanning apparatus for establishing a more accurate time gain control signal therefor.

Briefly, in accordance with the invention ultrasonic wave attenuation at different levels of tissue under examination is established by a time domain analysis, and the attenuation coefficients are then used to establish a time gain control signal for use in amplifying reflected ultrasonic waves.

More particularly, the zero crossing density of an ultrasonic wave at different levels within the tissue under examination is established, and the frequency dependent attenuation of the tissue between levels is established by comparing the density count at one level to the density count at a second level. By thus establishing the ultrasonic attenuation through the tissue sample a more accurate time gain control signal is established for the scanning apparatus. Alternatively, other repetitive features such as wave maxima are identified and a histogram of the features is established from which a frequency domain moment is determined by correlation.

The invention and objects and features thereof will be more readily apparent from the following detailed description and appended claims when taken with the drawing, in which a functional block diagram of apparatus in accordance with the invention useful in establishing ultrasonic attenuation in tissue under analysis.

Referring to the drawing, a reflected ultrasonic signal from tissue under examination is applied to a zero crossing detector 10. The detector 10 preferably comprises a monostable multivibrator which is triggered by a Schmitt trigger whereby a pulse is generated in response to each zero crossing of the reflected signal. Such a Schmitt trigger and monostable multivibrator is commercially available, for example the Texas Instruments 74221 integrated circuit device. The output of the detector 10 is a series of pulses which are then connected to a plurality of counters such as counter 1, counter 2,-counter N. In a preferred embodiment each counter is a conventional pulse counter. Alternatively, each counter can comprise capacitive means for storing charge in response to the pulses.

A master timer 18 controls each of the counters whereby a count is accumulated for a specific interval of time corresponding to a depth in the tissue under examination. The master timer receives an operator start signal and a sync signal from the ultrasonic scanner, and enable signals are then generated for each of the counters based on the time of flight of an ultrasonic wave in the tissue under examination and the depth of the tissue from which zero crossings for reflected signals are to be counted.

By comparing the count at one level to the count at another level the frequency dependent attenuation of an acoustic wave therebetween is established. By so establishing the attenuation throughout the tissue under examination a more accurate time gain control signal is established for the time gain compensated amplifier in the ultrasonic scanning apparatus.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of constructing a time gain control signal for a time gain compensated amplifier in an ultrasonic scanning system comprising the steps of transmitting an ultrasonic wave into an object, receiving a reflected ultrasonic signal from said object, detecting the zero crossing of said reflected ultrasonic wave, determining the zero crossing density of said ultrasonic wave at different levels in the object under examination, comparing the zero crossing density at each level to the zero crossing density at an adjacent level to determine the ultrasonic attenuation therebetween, and constructing a time gain control signal based on said attenuation.

* * * * *